US009971718B2

(12) United States Patent
He et al.

(10) Patent No.: US 9,971,718 B2
(45) Date of Patent: May 15, 2018

(54) DIFFERENTIAL AMPLITUDE DETECTOR

(71) Applicant: FINISAR CORPORATION, Sunnyvale, CA (US)

(72) Inventors: Hongdang He, Shanghai (CN); Qin Chen, Shanghai (CN)

(73) Assignee: FINISAR CORPORATION, Sunnyvale, CA (US)

( * ) Notice: Subject to any disclaimer, the term of this patent is extended or adjusted under 35 U.S.C. 154(b) by 307 days.

(21) Appl. No.: 14/834,722

(22) Filed: Aug. 25, 2015

(65) Prior Publication Data

US 2017/0005587 A1 Jan. 5, 2017

(30) Foreign Application Priority Data

Jun. 30, 2015 (CN) .......................... 2015 1 0378791

(51) Int. Cl.
*G01R 19/22* (2006.01)
*G06F 13/38* (2006.01)
(52) U.S. Cl.
CPC ...... *G06F 13/38* (2013.01); *G06F 2213/0026* (2013.01)
(58) Field of Classification Search
CPC ........ H05G 1/12; H05G 1/18; Y02B 70/1408; G01R 33/1207; G01R 31/36; G01R 19/0084; G01R 19/00
See application file for complete search history.

(56) References Cited

U.S. PATENT DOCUMENTS

2016/0025778 A1* 1/2016 Tokusaki ............... G01R 15/18
324/127
2016/0049857 A1* 2/2016 Zhang .................. H02M 7/217
363/127

* cited by examiner

*Primary Examiner* — Tung X Nguyen
(74) *Attorney, Agent, or Firm* — Maschoff Brennan (57) ABSTRACT

An example embodiment includes an idle state detection circuit. The idle state detection circuit includes a bias current loop, a rectifying circuit loop, a voltage translating loop, and a filter circuit. The bias current loop provides a rectifying diode a forward current such that the rectifying diode detects an alternating current (AC) signal received from a transmitter via one or more transmission nodes. The rectifying circuit loop stores differential peak to peak amplitude information representative of a peak to peak amplitude of the AC signal in a first capacitor that is electrically coupled to a cathode side of the rectifying diode. The voltage translating loop converts the differential peak to peak amplitude information stored at the first capacitor to a single-end voltage signal across a first resistor that is electrically coupled to the cathode side of the rectifying diode. The filter circuit filters an AC component of the single-end voltage signal.

20 Claims, 4 Drawing Sheets

DIFFERENTIAL AMPLITUDE DETECTOR

CROSS-REFERENCE TO RELATED APPLICATIONS

This patent application claims the benefit of and priority to Chinese Patent Application No. 201510378791.6, filed Jun. 30, 2015, which is incorporated herein by reference in its entirety.

FIELD

The embodiments discussed in this disclosure are related to differential amplitude detectors. In particular some embodiments discussed in this disclosure include differential amplitude detectors implemented in an active optical cable of a peripheral component interconnect express (PCIe) communication link.

BACKGROUND

Peripheral component interconnect express (PCIe) communication links include short serial communication links, which may be used to connect peripheral devices to a computer or to connect servers, for example. PCIe communication links generally conform to a PCIe standard, which establishes a standard layout for a PCIe standard bus and correspondingly a PCIe connector that may be included in peripheral devices. The PCIe standard is used throughout the computer industry and provides interchangeability of peripheral devices as well as establishes design criteria used in the development of peripheral devices.

Active optical cables (AOC) may be used in PCIe communication links. For example, an AOC may be implemented to connect two PCIe cards. The AOC may include an optical transmitter, an optical fiber, and an optical receiver. When implemented in a PCIe communication link, the optical transmitter may receive an electrical signal from a PCIe transmitter, convert the electrical signal to an optical signal representative of the electrical signal, and communicate the optical signal along the optical fiber. The optical receiver may receive the optical signal, convert it to an electrical signal, and communicate the electrical signal to a PCIe receiver.

The subject matter claimed herein is not limited to embodiments that solve any disadvantages or that operate only in environments such as those described above. Rather, this background is only provided to illustrate one example technology area where some embodiments described herein may be practiced.

SUMMARY

An example embodiment includes an idle state detection circuit. The circuit includes a bias current loop, a rectifying circuit loop, a voltage translating loop, and a filter circuit. The bias current loop is configured to provide a rectifying diode a forward current such that the rectifying diode is configured to detect an alternating current (AC) signal received from a transmitter via one or more transmission nodes. The rectifying circuit loop is configured to store differential peak to peak amplitude information representative of a peak to peak amplitude of the AC signal in a first capacitor that is electrically coupled to a cathode side of the rectifying diode. The voltage translating loop is configured to convert the differential peak to peak amplitude information stored at the first capacitor to a single-end voltage signal across a first resistor that is electrically coupled to the cathode side of the rectifying diode. The filter circuit is configured to filter an AC component of the single-end voltage signal.

Another example embodiment includes a method of idle state detection in a peripheral component interconnect express (PCIe) communication link. The method includes providing a rectifying diode a forward current from a bias current loop. The method includes receiving an AC signal that includes a time-varying differential voltage. The method includes detecting a peak to peak amplitude of the received AC signal. The method includes storing differential peak to peak amplitude information representative of the detected peak to peak amplitude in a first capacitor of a rectifying circuit loop. The method includes converting the differential peak to peak amplitude information to a single-end voltage signal across a first resistor.

Another example embodiment includes a PCIe active optical cable (AOC). The PCIe AOC includes an AOC receiver and a controller circuit. The AOC receiver includes an idle state detection circuit that is configured to measure a peak to peak amplitude of a radio frequency (RF) signal received from a PCIe transmitter and to output a direct current (DC) signal indicative of the peak to peak amplitude of the RF signal. The controller circuit is coupled to an output node of the idle state detection circuit. The controller circuit is configured to receive the DC signal, compare a magnitude of a voltage of the DC signal to a threshold magnitude of a particular threshold signal, and to generate a control signal configured to transition the PCIe communication link to an idle state based on the comparison.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Alternating current (AC) signals such as radio frequency (RF) signals within a particular peak to peak voltage range may be indicative of an operating communication link. Accordingly, detection of the AC signals or lack of the AC signals may be used to determine when a communication link is actively communicating data. In response to a lack of the AC signal having a peak to peak voltage magnitude within a particular range, the communication link may be placed in an electrical idle state.

Some applications use an application specific integrated circuit (ASIC) for AC signal detection. Implementation of the ASIC for AC signal detection results in multiple disadvantages. For example, the ASIC incurs high power consumption and is a high-cost device relative to passive electrical components. Moreover, the ASICs implemented for detection of RF signals may have a limited bandwidth and are often configured to be electrically coupled to a common reference ground with the RF signals being detected.

Accordingly, some embodiments discussed in this disclosure include an AC signal detector for peripheral component interconnect express (PCIe) transmitter idle state detection. The AC signal detector may efficiently detect relatively weak AC signals that may be communicated in a PCIe communication link. The AC signal detector includes passive electrical components to form a wideband detector. The AC signal detector may be included in an input stage of an active optical cable (AOC) PCIe receiver. The AC signal detector may be configured to detect an amplitude of an AC signal while using laser drivers in the PCIe receiver. The AC signal detector may not share a common ground reference with the AC signal being detected. This and other embodiments are described below with reference to the appended figures. In the figures, common item numbers are indicative of a common structure unless described otherwise.

Figure 1:
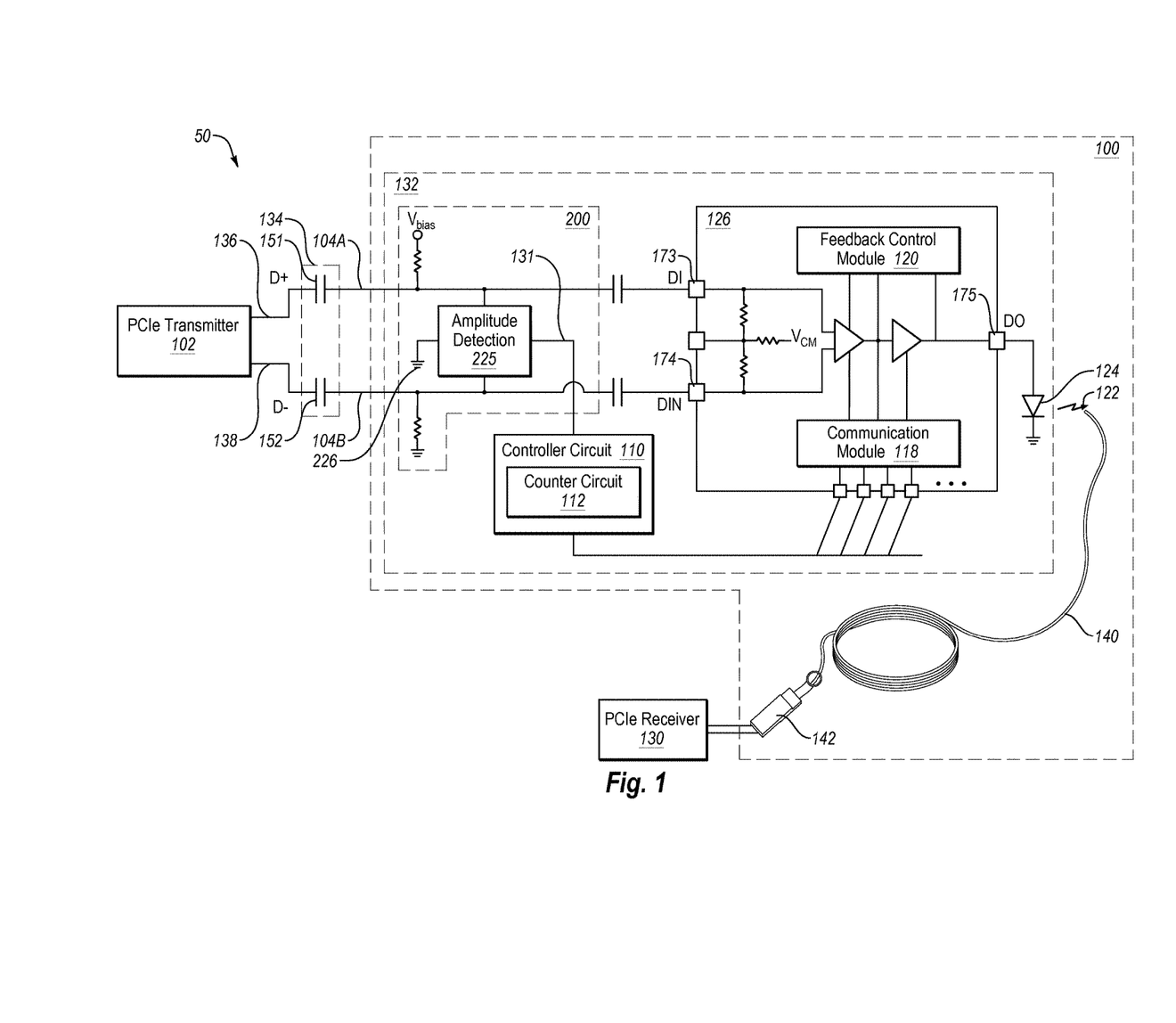
FIG. 1 illustrates an example peripheral component interconnect express (PCIe) communication link in which some embodiments may be implemented.

FIG. 1 illustrates an example PCIe communication link 50 in which some embodiments may be implemented. In the PCIe communication link 50, an idle state detection circuit (detection circuit) 200 may be implemented to detect an idle state of a PCIe transmitter 102. The PCIe communication link 50 is an example application in which the detection circuit 200 may be implemented. The detection circuit 200 may also be implemented in other communication systems implementing an AOC (e.g., AOC 100). For example, the detection circuit 200 may be implemented in qSFP, CXP, and CFP compliant optical systems implementing an AOC.

The PCIe communication link 50 includes an AOC 100. The AOC 100 may be configured to connect the PCIe transmitter 102 to a PCIe receiver 130. For example, the AOC 100 may include an AOC receiver 132, an optical fiber 140, and an AOC transmitter 142. The AOC receiver 132 may be coupled to the PCIe transmitter 102. Differential AC data signals (AC signals), which are represented in FIG. 1 by D+ and D−, may be communicated from the PCIe transmitter 102 to the AOC receiver 132. The AC signal D+/D− may include a differential AC signal such as a radio frequency (RF) signal that is generated at the PCIe transmitter 102 or a PCIe system (not shown).

The AOC receiver 132 may convert the AC signal D+/D− to an optical signal 122 that is communicated along the optical fiber 140 to the AOC transmitter 142. The AOC transmitter 142 converts the optical signal 122 to an electrical signal, which is communicated to the PCIe receiver 130.

In the embodiment of FIG. 1, the AC signal D+/D− may be communicated from the PCIe transmitter 102 to the AOC receiver 132 via an AC coupling 134. The AC coupling 134 may electrically couple differential data outputs 136 and 138 of the PCIe transmitter 102 to the AOC receiver 132. In the depicted embodiment, a positive differential data output is labeled 136 and a negative differential data output is labeled 138.

The AC coupling 134 may include a first source capacitor 151 and a second source capacitor 152. The first source capacitor 151 and the second source capacitor 152 may be AC coupling capacitors in some embodiments. The first source capacitor 151 may be electrically coupled to the positive differential data output 136 and a first transmission node 104A. The second source capacitor 152 may be electrically coupled to the negative differential data output 138 and a second transmission node 104B. The first and second transmission nodes 104A and 104B are collectively referred to as the transmission nodes 104. The first source capacitor 151 and the second source capacitor 152 may be configured to block DC electrical signals.

The AC signal D+/D− may be converted to the optical signal 122 using a laser driver 126 and a laser diode 124 of the AOC receiver 132. For example, the transmission nodes 104 may be electrically coupled to inputs 173 and 174 of the laser driver 126. The laser driver 126 may receive the AC signal D+/D− via the inputs 173 and 174. The laser driver 126 may modify (e.g., amplify, filter, compare, etc.) the AC signals D+/D−. The laser driver 126 may output a driver signal to the laser diode 124 via a driver output 175.

The laser driver 126 may include a feedback control module 120 and a communication module 118. The communication module 118 may receive feedback control data from the feedback control module 120. The feedback control data may be used to modify or to be incorporated into the driver signal.

An amplitude detection portion 225 of the detection circuit 200 may be coupled between the transmission nodes 104. The amplitude detection portion 225 may be configured to measure the AC signal D+/D− received from the PCIe transmitter 102. The amplitude detection portion 225 may output a direct current (DC) signal indicative of the peak to peak amplitude of the AC signal D+/D− to a controller circuit 110. In the embodiment of FIG. 1, the DC signal may not share a common reference node with the AC signal D+/D−.

The controller circuit 110 may be coupled to an output node 131 of the detection circuit 200. The controller circuit 110 may be configured to receive the DC signal and to compare a magnitude of a voltage of the DC signal to a threshold magnitude of a particular threshold signal. The controller circuit 110 may be configured to generate a control signal based on the comparison. The control signal may be configured to transition the PCIe communication link 50 to an electrical idle state or to an active state.

For example, the magnitude of the voltage of the DC signal being less than the threshold magnitude may be indicative of an interruption in the AC signal D+/D−. The interruption may be because the PCIe transmitter 102 is not communicating the AC signal D+/D− to the AOC receiver 132. The controller circuit 110 may accordingly generate a control signal that is configured to transition the PCIe communication link 50 to an electrical idle state.

In some embodiments, in response to the magnitude of the DC signal being greater than the threshold magnitude, no control signal may be generated. For instance, during operation of the PCIe communication link 50 in which the AC signal D+/D− is consistent, no control signal may be generated.

The controller circuit 110 may be coupled to the communication module 118. The control signal may be communicated to the communication module 118. The communication module 118 may receive the control signal from the controller circuit 110. The control signal may be used to modify or be incorporated into the driver signal. The driver signal including the control signal is represented in the optical signal 122 that is communicated to the AOC transmitter 142. The AOC transmitter 142 converts the optical signal 122 to an electrical signal that includes a representation of the control signal. When the electrical signal is received by the PCIe receiver 130, it may transition the PCIe receiver 130 into an electrical idle state.

In some embodiments, the controller circuit 110 may include a counter circuit 112. The counter circuit 112 may be configured to count to at least one predetermined time period before generation of the control signal. The counter circuit 112 may incorporate a delay into the PCIe communication link 50 to ensure actual idle state of the predetermined time is occurring rather than a temporary interruption in the AC signal D+/D−.

Figure 2:
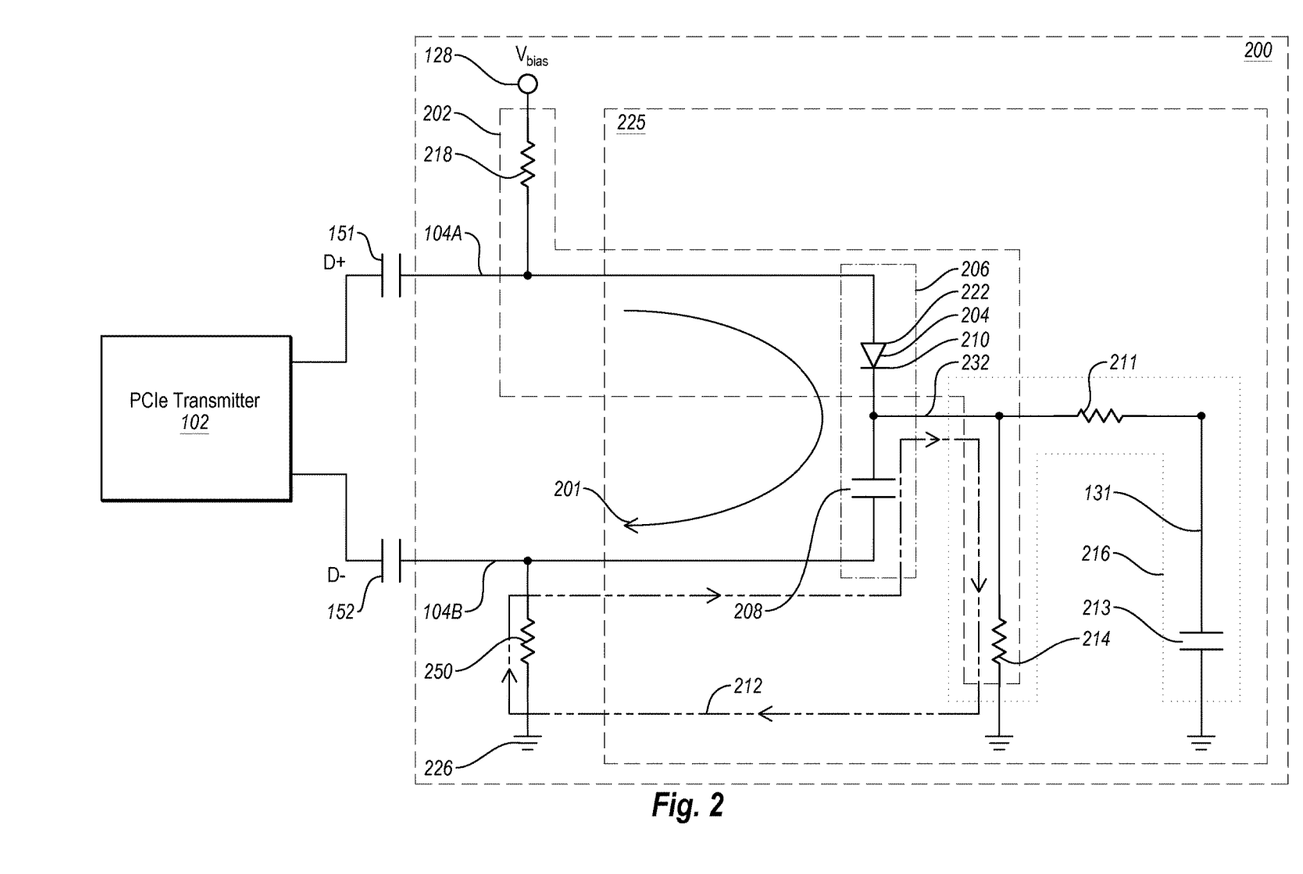
FIG. 2 illustrates an example detection circuit that may be implemented in PCIe communication link of FIG. 1.

FIG. 2 illustrates an example embodiment of the detection circuit 200 that may be implemented in the PCIe communication link 50 of FIG. 1. In FIG. 2, the detection circuit 200 is depicted with the PCIe transmitter 102, the first source capacitor 151, the second source capacitor 152, and the transmission nodes 104 described with respect to FIG. 1.

The detection circuit 200 may include a bias current loop 202, a rectifying circuit loop 206, a voltage translating loop 212, and a filter circuit 216. The bias current loop 202 may be configured to provide a rectifying diode 204 a forward current. The forward current may enable the rectifying diode 204 to detect the AC signal D+/D− received from the PCIe transmitter 102 via the first transmission node 104A.

The bias current loop 202 may include the rectifying diode 204, a first resistor 214, and a second resistor 218. The first resistor 214 may be electrically coupled to an intermediate node 232 and a reference node 226. The intermediate node 232 includes a cathode side 210 of the rectifying diode 204. The reference node 226 may be shared with the AC signal D+/D−. The second resistor 218 may be electrically coupled to a bias voltage source 128 and to the first transmission node 104A. The first transmission node 104A may be electrically coupled to an anode side 222 of the rectifying diode 204 and to the first source capacitor 151.

The rectifying circuit loop 206 may be configured to store differential peak to peak amplitude information in a first capacitor 208. The differential peak to peak amplitude information may be representative of a peak to peak amplitude of the AC signal D+/D−. The first capacitor 208 may be electrically coupled to the cathode side 210 of the rectifying diode 204. In FIG. 2, an arrow 201 indicates a direction the AC signal D+/D− proceeds through the rectifying diode 204 and the first capacitor 208.

In the embodiment of FIG. 2, the first capacitor 208 may be electrically coupled to the intermediate node 232. The intermediate node may be positioned between the cathode side 210 of the rectifying diode 204, the first resistor 214, and a fourth resistor 211. The first capacitor 208 may also be electrically coupled to the second transmission node 104B.

The voltage translating loop 212 may be configured to convert the differential peak to peak amplitude information stored at the first capacitor 208 to a single-end voltage across the first resistor 214. The voltage signal across the first resistor 214 may be approximately linearly related to the peak to peak amplitude of the AC signal D+/D−. The voltage translating loop 212 may include the first capacitor 208, the first resistor 214, and a third resistor 250. The third resistor 250 may be electrically coupled to the second transmission node 104B and to the reference node 226.

The voltage translating loop 212 may be further configured to define a bias current and discharging time constant. The discharging time constant may reduce an impact of the rectifying circuit loop 206 on the AC signal D+/D− and/or at least partially control a conduction angle of the rectifying diode 204 and/or varying a magnitude of the bias current though the rectifying diode. In some embodiments, the discharging time constant may be defined according to a time constant expression:

$$TC = C1 \times (R1 + R3)$$

In the time constant expression, TC represents discharging time constant. A variable C1 represents a capacitance of the first capacitor 208. A variable R1 represents a resistance of the first resistor 214. The variable R3 represents a resistance of the third resistor 250.

The filter circuit 216 may be configured to filter an AC component of the single-end voltage. In some embodiments, the filter circuit 216 includes the first resistor 214, the fourth resistor 211, and a second capacitor 213. The fourth resistor 211 is electrically coupled to the output node 131 and to the intermediate node 232. The second capacitor 213 is electrically coupled to the output node 131 and the reference node 226. After the AC component of the single-end voltage is filtered, the DC signal may be available on the output node 131, which may be coupled to the controller circuit 110. The DC signal may include a magnitude that is compared to a threshold magnitude at the controller circuit 110.

Figure 3:
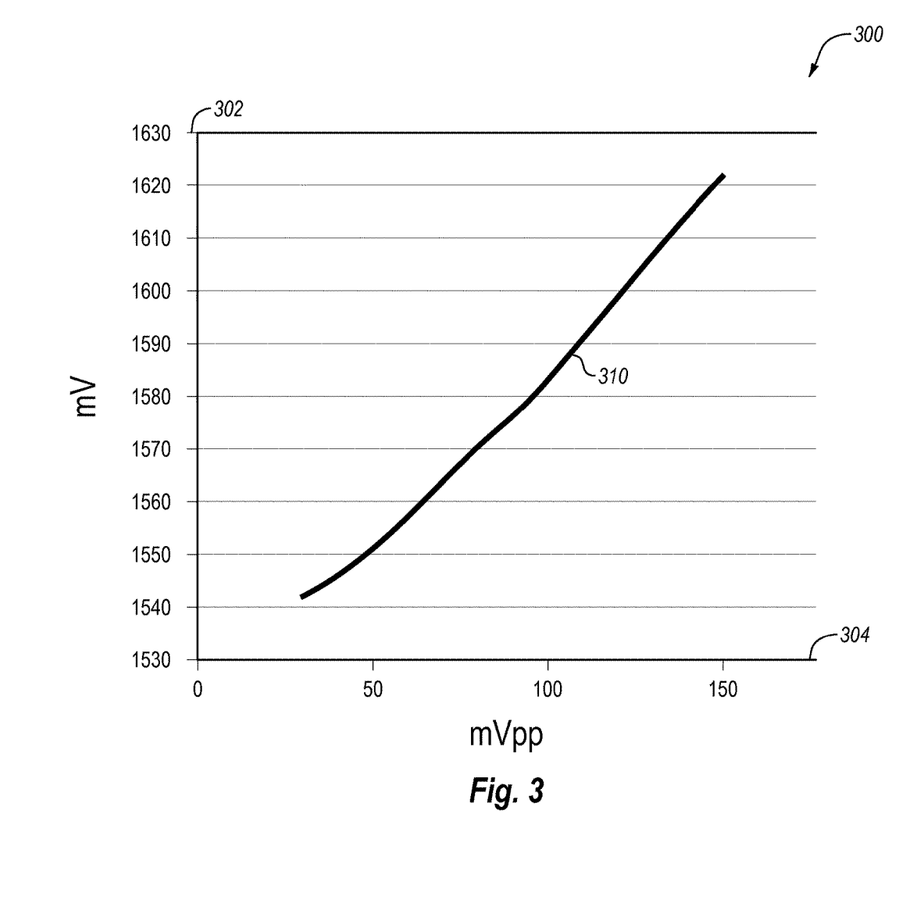
FIG. 3 illustrates a plot of a voltage relationship generated using a simulated detection circuit.

FIG. 3 illustrates a plot 300 of a voltage relationship 310 that may be generated using a simulated detection circuit. The simulated detection circuit includes a configuration substantially similar or identical to the detection circuit 200 discussed with reference to FIGS. 1 and 2. In particular, a first resistor and a second resistor of the simulated circuit each includes a resistance of about 10 kilohms (kΩ), a third resistor and a fourth resistor of the simulated circuit each includes a resistance of about 1 kΩ, a first capacitor and second capacitor of the simulated circuit each includes a capacitance of about 100 picoFarads (pF), a first source capacitor and second source capacitor each includes a capacitance of about 100 nanoFarads (nF), the bias voltage is about 3.3 volts (V), and an AC signal includes a frequency of about 2.5 gigahertz (GHz). The DC signal is measured at an output node of the simulated detection circuit.

In the plot 300, a magnitude of the voltage of the DC signal is plotted along the y-axis 302. The units of the magnitude of the voltage of the DC signal are millivolts (mV). A peak to peak differential amplitude of a simulated AC signal is plotted on the x-axis 304. The units of the peak to peak differential amplitude are mV peak to peak (mVpp). The voltage relationship 310 in FIG. 3 is an approximate linear relationship. Accordingly, with reference to FIG. 2, the DC signal at the output node 131 is approximately linearly related to the peak to peak amplitude of the AC signal D+/D−.

Figure 4:
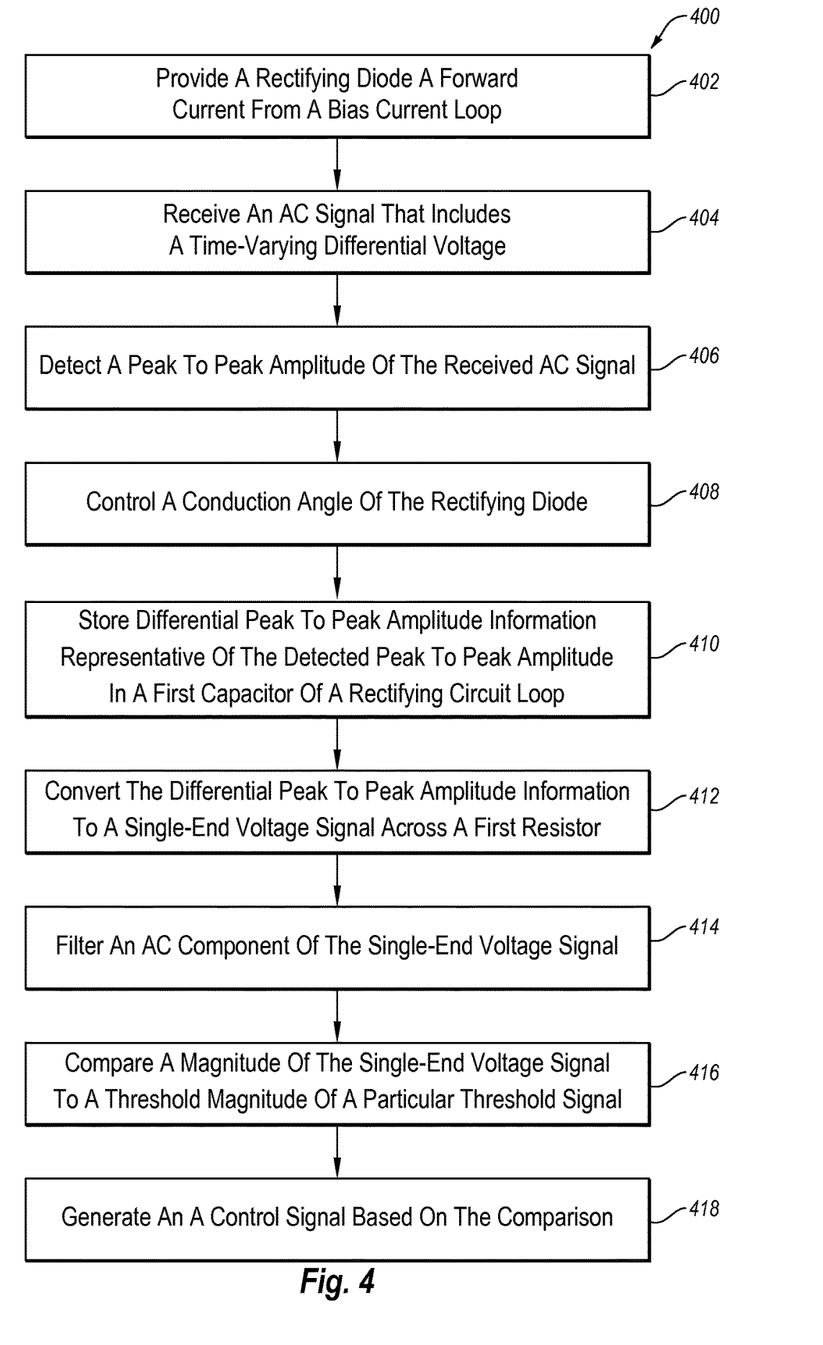
FIG. 4 is a flow chart illustrating an example method of idle state detection.

FIG. 4 is a flow chart of an example method 400 of idle state detection in a PCIe communication link, arranged in accordance with at least one embodiment described herein. The method 400 of FIG. 4 may be implemented, in whole or in part, by an appropriate device or circuit, such as the AOC 100 and/or the detection circuit 200 described herein. Although illustrated as discrete blocks, various blocks may be divided into additional blocks, combined into fewer blocks, or eliminated, depending on the desired implementation.

The method 400 may begin at block 402 in which a rectifying diode may be provided a forward current from a bias current loop. At block 404, an AC signal may be received. The AC signal may include a time-varying differential voltage signal, which may be relatively weak. At block 406, a peak to peak amplitude of the received AC signal may be detected. At block 408, a conduction angle of the rectifying diode may be controlled. Control of the conduction angle may at least partially reduce an impact of a rectifying circuit loop on a PCIe transmitter that communicates the AC signal. In some embodiments, the conduction angle may be controlled by varying discharging time constant and/or varying a magnitude of a bias current through the rectifying diode. At block 410, differential peak to peak amplitude information representative of the detected peak to peak amplitude may be stored in a first capacitor of a rectifying circuit loop.

At block 412, the differential peak to peak amplitude information may be converted to a single-end voltage signal across a first resistor. At block 414, an AC component of the single-end voltage signal may be filtered. The single-end voltage signal with the AC component filtered may include a DC signal. In some embodiments, a magnitude of a voltage of the DC signal may approximately linearly vary based on the peak to peak amplitude of the received AC signal. At block 416, the magnitude of the voltage of the DC signal may be compared to a threshold magnitude of a particular threshold signal.

At block 418, a control signal may be generated based on the comparison. For example, the magnitude of the DC signal being less than the threshold magnitude may indicate an interruption in the operation of a communication link. Accordingly, the control signal may be generated that is configured to transition the communication link to an electrical idle state. In these and other embodiments, in response to the magnitude of the DC voltage signal being greater than the threshold magnitude, the control signal may not be generated.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other non-transitory storage medium which may be used to carry or store desired program code means in the form of computer-executable instructions or data structures and which may be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. An idle state detection circuit, the circuit comprising:
a bias current loop that is configured to provide a rectifying diode a forward current such that the rectifying diode is configured to detect an alternating current (AC) signal received from a transmitter via one or more transmission nodes;
a rectifying circuit loop that is configured to store differential peak to peak amplitude information representative of a peak to peak amplitude of the AC signal in a first capacitor that is electrically coupled to a cathode side of the rectifying diode;
a voltage translating loop that is configured to convert the differential peak to peak amplitude information stored at the first capacitor to a single-end voltage signal across a first resistor that is electrically coupled to the cathode side of the rectifying diode; and
a filter circuit that is configured to filter an AC component of the single-end voltage signal.

2. The idle state detection circuit of claim 1, wherein:
the bias current loop includes a second resistor, the rectifying diode, and the first resistor,
the second resistor is electrically coupled to a bias voltage source and to a first transmission node of the transmission nodes,
the first transmission node is electrically coupled to an anode side of the rectifying diode and to a first source capacitor, and
the first resistor is also electrically coupled to a reference node.

3. The idle state detection circuit of claim 2, wherein:
the rectifying circuit loop includes the rectifying diode and the first capacitor,
the first capacitor is electrically coupled to an intermediate node positioned between the cathode side of the rectifying diode, the first resistor, and a fourth resistor, and
the first capacitor is electrically coupled to a second transmission node of the transmission nodes that is positioned between a second source capacitor and a third resistor.

4. The idle state detection circuit of claim 3, wherein:
the voltage translating loop includes the first capacitor, the first resistor, and the third resistor;
the first resistor is electrically coupled to the intermediate node and to the reference node; and
the third resistor is electrically coupled to the second transmission node and to the reference node.

5. The idle state detection circuit of claim 4, wherein:
the filter circuit includes the first resistor, the fourth resistor, and a second capacitor,
the fourth resistor is electrically coupled to an output node and to the intermediate node, and
the second capacitor is electrically coupled to the output node and the reference node.

6. The idle state detection circuit of claim 4, wherein:
the voltage translating loop is configured to define a discharging time constant that is calculated according to an expression:

$$TC = C1 \times (R1+R3), \text{ in which:}$$

TC represents discharging time constant,
C1 represents a capacitance of the first capacitor;
R1 represents a resistance of the first resistor; and
R3 represents a resistance of the third resistor.

7. The idle state detection circuit of claim 6, wherein the discharging time constant is configured to at least partially control a conduction angle of the rectifying diode.

8. The idle state detection circuit of claim 1, wherein the voltage signal across the first resistor is approximately linearly related to the peak to peak amplitude of the AC signal.

9. An active optical cable (AOC) configured for a peripheral component interconnect express (PCIe) communication link, the AOC comprising:
the idle state detection circuit of claim 1; and
a controller circuit that is electrically coupled to the idle state detection circuit to receive a DC signal that is representative of the single-end voltage signal with the AC component filtered, wherein the controller circuit is configured to compare a magnitude of a voltage of the DC signal to a threshold magnitude of a particular threshold signal.

10. The circuit of claim 1, wherein:
the AC signal includes a radio frequency (RF) signal generated at a peripheral component interconnect express (PCIe) transmitter, and
the single-end voltage signal does not share a common reference with the RF signal.

11. A method of idle state detection in a peripheral component interconnect express (PCIe) communication link, the method comprising:
providing a rectifying diode a forward current from a bias current loop;
receiving, at the rectifying diode, an alternating current (AC) signal that includes a time-varying differential voltage;
detecting, at the rectifying diode, a peak to peak amplitude of the received AC signal;
storing differential peak to peak amplitude information representative of the detected peak to peak amplitude in a first capacitor of a rectifying circuit loop; and
converting the differential peak to peak amplitude information to a single-end voltage signal across a first resistor.

12. The method of claim 11, further comprising filtering an AC component of the single-end voltage signal.

13. The method of claim 11, wherein a magnitude of a voltage of the single-end voltage signal is approximately linearly related to the peak to peak amplitude of the received AC signal.

14. The method of claim 11, further comprising:
comparing a magnitude of a voltage of a DC signal that is representative of the single-end voltage signal to a threshold magnitude of a particular threshold signal; and
in response to the magnitude of the voltage of the DC signal being less than the threshold magnitude, generating a control signal configured to transition the PCIe communication link to an electrical idle state.

15. The method of claim 11, further comprising controlling a conduction angle of the rectifying diode.

16. A peripheral component interconnect express (PCIe) active optical cable (AOC) comprising:
an AOC receiver including an idle state detection circuit that is configured to measure a peak to peak amplitude of a radio frequency (RF) signal received from a PCIe transmitter and to output a direct current (DC) signal indicative of the peak to peak amplitude of the RF signal; and
a controller circuit coupled to an output node of the idle state detection circuit, wherein the controller circuit is configured to receive the DC signal, compare a magnitude of a voltage of the DC signal to a threshold magnitude of a particular threshold signal, and to generate a control signal configured to transition the PCIe communication link to an electrical idle state based on the comparison.

17. The PCIe AOC of claim 16, wherein the idle state detection circuit includes:
a bias current loop that is configured to provide a rectifying diode a forward current such that the rectifying diode is configured to detect peak to peak voltage of the RF signal;
a rectifying circuit loop that is configured to store differential peak to peak amplitude information of the RF signal in a first capacitor that is electrically coupled to a cathode side of the rectifying diode;
a voltage translating loop that is configured to convert the differential peak to peak amplitude information stored at the first capacitor to the DC signal which is supplied across a first resistor that is electrically coupled to the cathode side of the rectifying diode; and
a filter circuit configured to filter an alternating current (AC) component of the DC signal supplied across the first resistor.

18. The PCIe AOC of claim 17, wherein:
a conduction angle of the rectifying diode is controlled by varying discharging time constant and/or varying a magnitude of a bias current through the rectifying diode; and
the DC signal does not share a common reference node with the RF signal.

19. The PCIe AOC of claim 16, wherein the idle state detection circuit includes:
a first transmission node and a second transmission node;
a first resistor coupled to the first transmission node and to a bias voltage source;
a diode coupled to the first transmission node and to an intermediate node;
a first capacitor coupled to the second transmission node and to the intermediate node;
a second resistor coupled to the second transmission node and to a reference node;
a third resistor coupled to the intermediate node and to the reference node;
a fourth resistor coupled to the intermediate node and to an output node;

a second capacitor coupled to the output node and to the reference node;

a third capacitor coupled to the first transmission node; and a fourth capacitor coupled to the second transmission node, wherein:

the third and fourth capacitors are configured to block DC electrical signals; and the fourth resistor and the second capacitor are configured to filter an AC component of the DC signal.

20. The PCIe AOC of claim 16, wherein the controller circuit includes a counter circuit configured to count to at least one predetermined time period before generation of the control signal.

* * * * *